July 5, 1966  K. HEHL  3,259,356
INJECTION MOLDING DEVICE
Filed Oct. 5, 1964  4 Sheets-Sheet 1

Inventor:
KARL HEHL
BY Spencer & Kaye
ATTORNEYS

July 5, 1966 K. HEHL 3,259,356
INJECTION MOLDING DEVICE
Filed Oct. 5, 1964 4 Sheets-Sheet 2
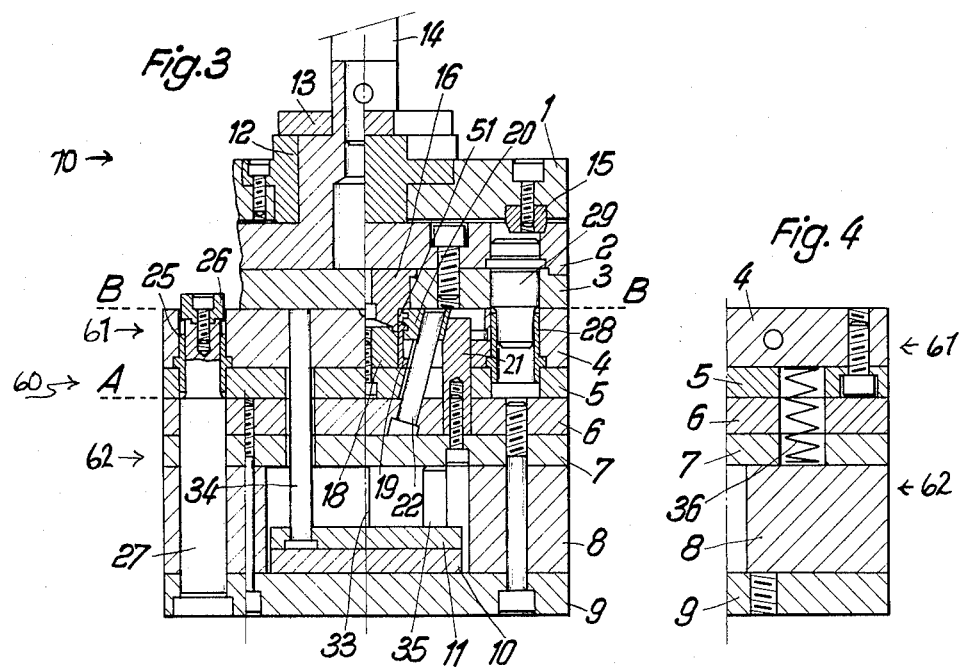
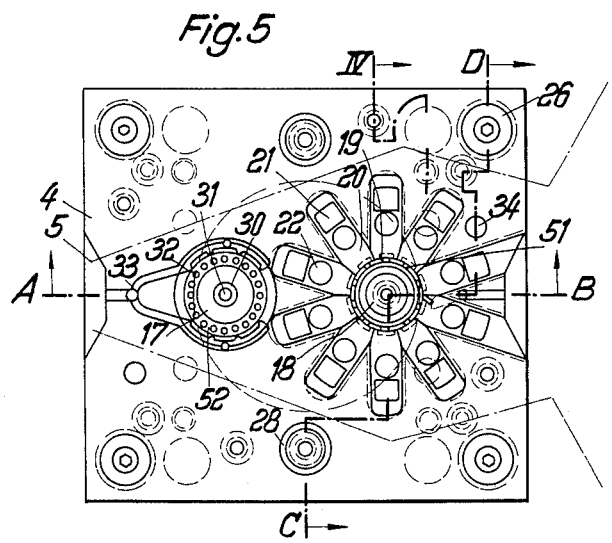
Inventor:
KARL HEHL,
BY Spencer & Kaye
ATTORNEYS July 5, 1966 K. HEHL 3,259,356
INJECTION MOLDING DEVICE
Filed Oct. 5, 1964 4 Sheets-Sheet 4

Inventor:
KARL HEHL
BY Spencer & Kaye
ATTORNEYS

United States Patent Office 3,259,356
Patented July 5, 1966

3,259,356
INJECTION MOLDING DEVICE
Karl Hehl, Lossburg, Wurttemberg, Germany, assignor to Arburg Maschinenfabrik Hehl & Sohne, Lossburg, Wurttemberg, Germany
Filed Oct. 5, 1964, Ser. No. 401,611
Claims priority, application Germany, Oct. 12, 1963,
A 44,291
8 Claims. (Cl. 249—161)

The present invention relates generally to casting molds for injection molding machines, and, more particularly, to such casting molds for the production of a multicolored injection molded article.

A main object of the invention is to provide a mold for use in making two-color or two-material articles which provides a substantial saving in time and thus in cost.

Another object of the present invention is to provide a casting mold for injection molding machines having two injection units wherein upon each injection cycle, a finished two-color molded article is provided.

A further object of the invention is to provide a molding device of the character described wherein the two-color molded article can be produced of at least partially cylindrical shape and has symbols such as numbers or letters on the exterior or circumferential surface thereof and which can be discerned due to color contrast.

These objects and others ancillary thereto are accomplished in accordance with preferred embodiments of the invention wherein a mold is provided with two halves and at least one part of one of the mold halves is mounted for rotation and this part is provided with at least two mold profile surfaces. When the mold is closed these surfaces, by meeting with the mold surfaces of the other mold half, define hollow mold chambers of which one is provided with the configuration of a first color component of the molded article and the other corresponds to the configuration of the entire molding.

One of the mold halves includes two sections which are movable within limits with respect to each other in the direction in which the mold closes. Pins which are inclined toward the mold closing direction and which are associated with one mold half section engage and conform in shape to sliding plugs of the other section. These plugs are displaceable at right angles to the mold closing direction and have a function in the formation of the hollow mold intended for the first color component of the molded article.

Thus, a casting mold can be constructed for the injection molding machine having two injection units with each injection cycle initiated by closing the casting mold and ended by opening the casting mold; and a finished two-color molded article of at least partially cylindrical shape is ejected on whose outer surface symbols such as numbers or letters are arranged and which are discernible due to color contrast.

Additional objects and advantages of the present invention will become apparent upon consideration of the following description when taken in conjunction with the accompanying drawings in which:

FIGURE 3 is a sectional view taken substantially along the plane defined by reference line III—III of FIGURE 2.

FIGURE 4 is a fragmentary sectional view taken along line IV of FIGURE 5.

FIGURE 5 is an elevational view illustrating the lower mold half shown in FIGURE 1 as viewed along the plane generally defined by reference line X—X.

Figure 1:
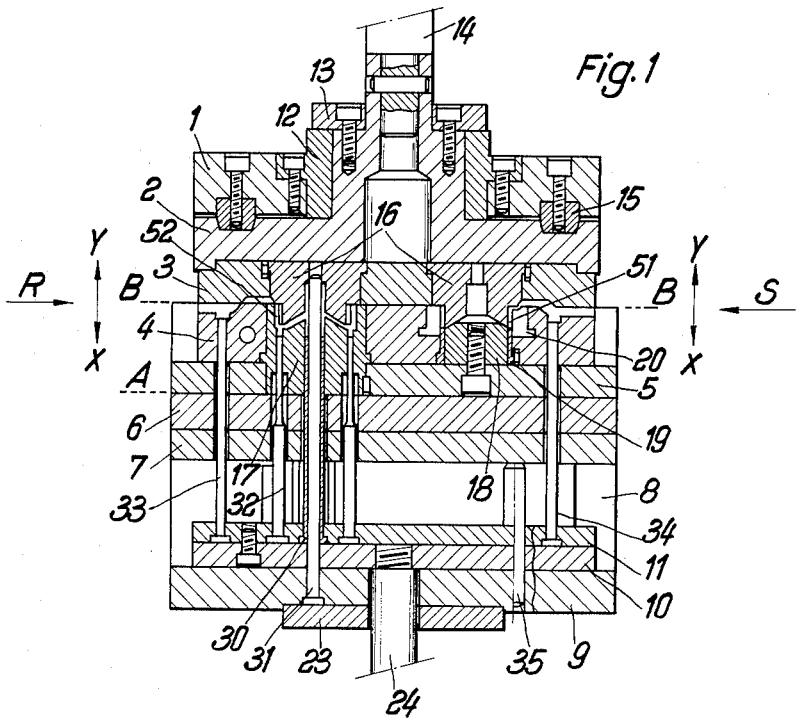
FIGURE 1 is a longitudinal sectional view through the casting mold taken generally along the plane of reference line I—I of FIGURE 2.
Figure 2:
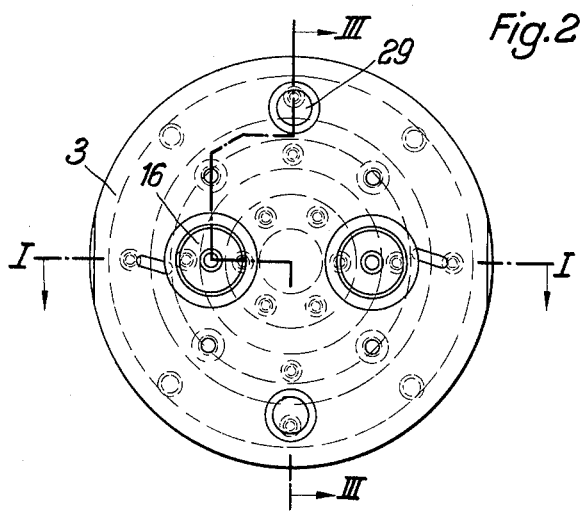
FIGURE 2 is an elevational view showing the rotatably mounted casting mold half of FIGURE 1 and viewed from the plane defined by reference line Y—Y.

The casting mold of the present invention is intended for use in an injection molding machine which processes thermoplastic materials and such an injection molding machine should have at least two injection units. This can be used for producing radial symmetrical multicolored or multi-material molded articles of at least partially cylindrical configuration. The different color and/or material used in the molded articles is molded onto each other in such a manner that the figures and/or letters are discernible on the outer surface of the molding due to color contrast.

The casting mold includes two mold halves 70 and 60 which are movable with respect to each other and with the aid of a mold closing device. The mold half 70 includes elements 2, 3 and 13 through 16, and is rotatably mounted about an axis which extends parallel to the closing direction of the casting mold. The bearing for this mold half is a two-piece mold portion including a spacer ring 12 and a ring 1 (see FIGURE 6) and this mold portion is fixedly connected with a stationary mold clamping plate 44. A disc-like portion 13 of the rotatably mounted mold half extends behind the centering spacer ring 12 of the stationary pivot bearing 1, 12.

The rotatable mold half includes a rotating disc 2, a fitting plate 3 which sits in front of and is bolted to disc 2, a fastening ring 13 fixed to disc 2, a stationary guide ring 15 for guiding the movement of the mold when it rotates, mold profile dies 16 and guide pin 29.

Figure 7:
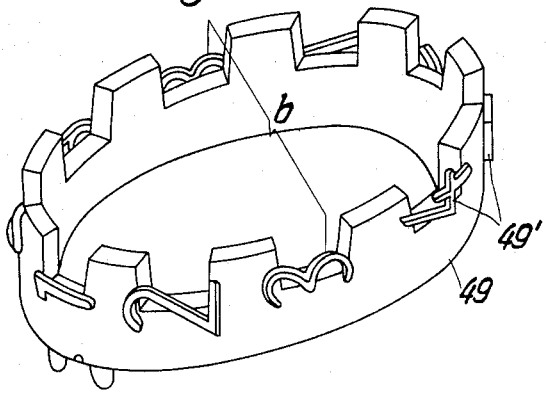
FIGURE 7 is a perspective view of a semi-finished molded article.
Figure 8:
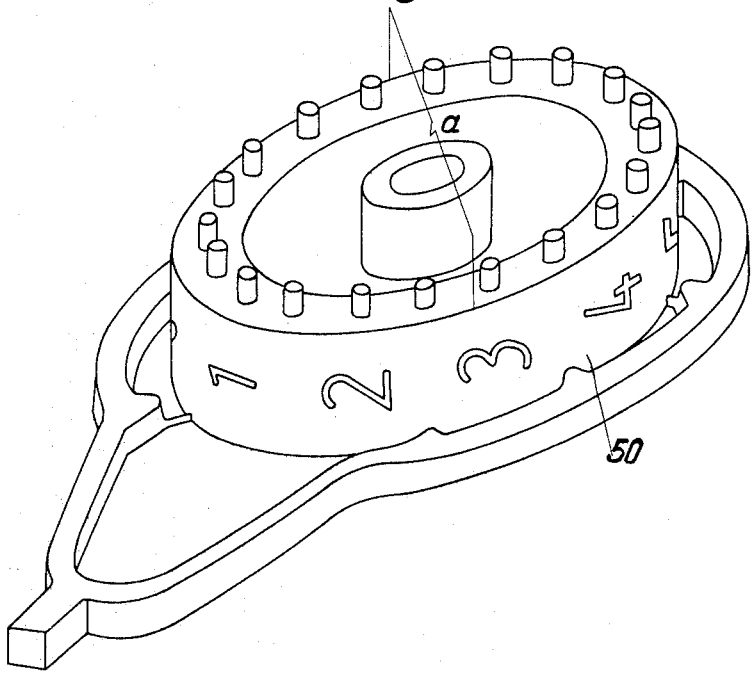
FIGURE 8 is a perspective view of a finished molded article in the form of a number roll.

When the casting mold is closed, the rotatable casting mold half in the region of its two mold-profile surfaces formed by the dies 16 and together with mold profile surfaces of the non-rotatable mold half 60 including elements 4–12, 17–28 and 30–35, forms two hollow molds or molding chambers 51, 52 which lie diametrically opposite each other with respect to the axis of rotation of the rotatable mold half. Of these two hollow mold chambers, the one designated 51 has the configuration of the first color and/or material component 49 (see FIGURE 7 showing the semi-finished molded article) of the two-color molded article to be produced. The other, designated 52, has the configuration of the finished two-color molded article 50, as shown in FIGURE 8.

Figure 6:
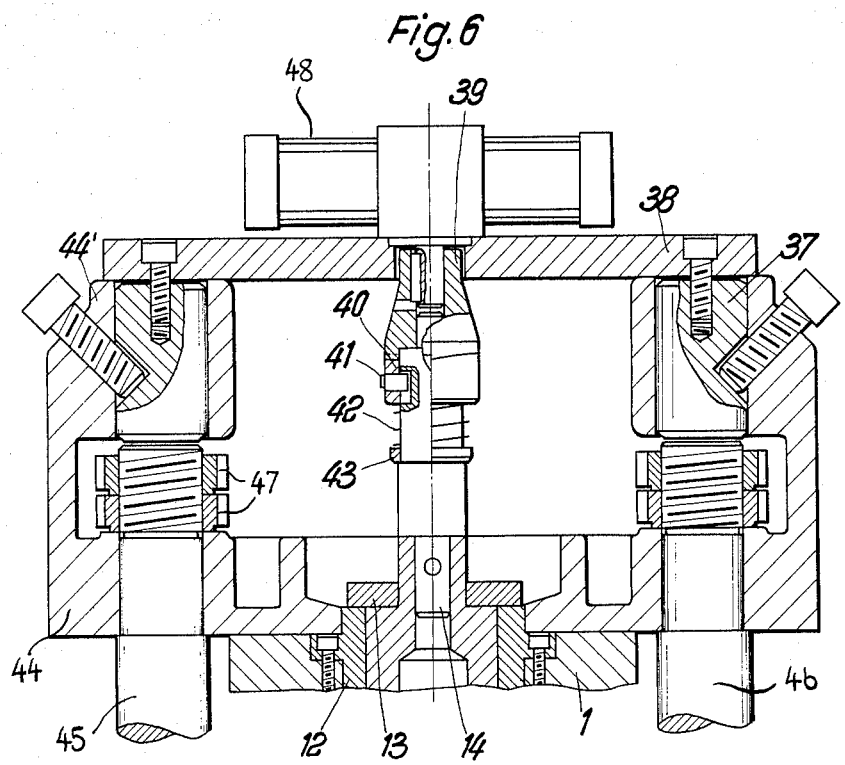
FIGURE 6 is an elevational view partly in section of the upper or rear mold half as well as the mold clamping plate and the rotary drive.

As shown in FIGURE 6, the mold clamping plate 44 is fastened in place by means of lock nuts 47 on the ends of support bars 45, 46 for the mold closing device. This stationary mold clamping plate 44 has a circular cross section and an outer rim 44' which extends rearwardly or upwardly as shown in the figure. A disc-like bridge member 38 is mounted on the end face of outer rim 44' and the bridge member 38 is connected with the outer rim by means of receiving rollers 37. The bridge member carries a hydraulic cylinder 48 which is arranged as a rotary cylinder. In such a rotary cylinder the stroke of the piston is converted into rotational motion of the shaft extending at right angles to the piston rod. A serrated or toothed piston rod is in engagement with a pinion which is seated upon the composite shaft 14, 39–43, translating the rotary motion. This shaft includes a one-way clutch 39–42 which permits transmission of rotary movement only in one rotational direction upon the rotatable mold half. This shaft also includes a carrier pin 14, a carrier sleeve or bushing 39, an entrainer ring 40, a follower pin 41, a compression spring 42, and a bearing or contact ring 43.

The stroke which is directed oppositely to the working stroke of the piston of the rotary cylinder 48 is compensated for by the one-way clutch arrangement. The working stroke occurs when the mold is opening and the idle stroke of the piston of the rotary cylinder occurs when the mold is closing.

The non-rotatable mold half 60 including elements 4–11, 17–28, and 30–35, is composed of two structural sections 61 and 62 which are, to a minor degree, movable relatively to each other in the opening or closing direction respectively of the casting mold. Section 61 of the non-rotatable mold half is in the vicinity of the parting line B of the casting mold and includes a rearwardly positioned mold profile plate 4, a cover plate 5 fixed thereto, a mold profile counter piece 17 for the finished mold, the mold profile die 18 for the semi-finished mold, the sleeve 19, the sliding plugs 20, bushing 25, abutment disc 26, and bushing 28.

The other structural section 62 of the non-rotatable mold half includes the intermediate plate 6 which is adjacent cover plate 5, a cover plate 7 fixed to plate 6, a spacer strip 8 and a rear clamping plate 9 both fixed to plates 6 and 7, ejector plate 10, ejector plate 11 fixed to plate 10, the tapered support 21, the inclined pin 22, the centering collar 23, the ejector actuating shaft 24, the guide column 27, ejector sleeve 30, the core die 31, ejector 32, the discharge ejector 33, pin 34, and the dowel pin 35. The separating plane between these sections is designated A in FIGURES 1 and 3, and the parting line between the two mold halves is indicated at B. Springs 36 are provided so that the two sections, when the mold is opening, arrive at a maximal distance from each other and this distance is determined by stops.

The ejection assembly includes plates 10 and 11 which are fixed to each other as well as an ejector actuating shaft 24 fixed to plate 10 and movable axially in rear clamping plate 9 to actuate the ejector pins 33, 32, and 34, as well as ejector sleeve 30.

Pins 22 are arranged in the form of a closed geometrical figure, e.g. in a circular manner and are inclined toward the mold closing direction. These pins have inner and outer abutment surfaces and are anchored in the structural section 62 of the non-rotatable mold half, which is the lower one shown in FIGURE 1. These pins 22 engage the inner and outer abutment surfaces of sliding plugs or slide bars 20 of the other section of this mold half. These plugs or bars are arranged in a starlike manner and are mounted to be displaceable in a direction at right angles to the closing direction. The end faces of the sliding plugs 20 arranged in the star-like manner form a cylindrical wall limiting the outer surface of the cylindrical semi-finished molding 49. Each of these end faces is provided with a figure which is worked in a concave manner into the faces thereof. When the mold is closed, each sliding plug is rearwardly supported by a support member 21 which is anchored in the rear section 62 of the non-rotatable mold half (see FIGURES 3 and 5).

The diameter of the mold chamber 52 for the entire molding corresponds exactly to the maximum diameter b (see FIGURE 7) of the semi-finished molding 49 and this diameter is determined by the surfaces of the figures provided on the outer surface of the semi-finished molding. The non-rotatably mounted mold half is provided with ejector pins 32, 33, 34 in the plane of the hollow mold chamber 52, that is, at the height of this mold chamber. If the injecting direction extends horizontally and the closing and/or opening direction of the casting mold extends vertically, there is also provided a blowing device which is controlled synchronously with the closing stroke of the casting mold, and this device blows the finished molding out of the zone between the two mold halves into which zone it had been ejected, and thus the blowing device is arranged horizontally at the parting point between the two molds.

The injection cylinders of the two injection units of the injection molding machine (not shown) are positioned coaxially with respect to each other. Their injection axes R and S are directed oppositely to each other as shown in FIGURE 1 and are disposed at the height of the parting line B—B of the casting mold. The plastic material passes into the two mold chambers 51, 52 by means of a network of runners.

The operation of the casting mold will now be set forth. Starting with the closed casting mold, the finished two-color molded article 50 is ejected during the opening stroke or motion, and this is accomplished by the ejector pins 32, 33 and ejector sleeve 30 which eject it from the die 17 of the non-rotatably mounted casting mold half 60. At the moment of ejection, the air jet of a blow nozzle actuated with the opening stroke hits the molding and by means of this air jet the molding is removed from the zone between the two mold halves. Simultaneously, at the beginning of the opening motion of the casting mold the semi-finished molded article 49 is freed from its outer mold shell formed by the sliding plugs 20 by displacing these plugs a little in the radial direction in the course of the opening motion, that is, in a direction extending at right angles to the opening motion. This displacing is done by means of the inclined pins 22 since upward movement of section 61 with respect to section 62 causes plugs 20 to ride on pins 22 and be cammed radially outwardly. The semi-finished molded article 49 which has thus been freed and which is sitting on the die 16 of the rotatable mold half, is now carried along with this upper rotatable mold half, which rotates by 180° during the opening motion.

The semi-finished molded article arrives at a position disposed diametrically to its previous position and the casting mold is now closed by means of the mold closing device. Because of this, the semi-finished molded article enters the mold chamber 52 in which the finished two-color molded article had previously been disposed. During the ejection operation which now follows, a new semi-finished molded article 49 is formed by injecting in injecting direction S while at the same time the previously semi-finished molded article sitting on the die 16, which had been formed during the preceding injection cycle, is now supplemented to form a complete molded article by injecting plastic material in the injection direction R and this takes place in the mold chamber 52.

It is essential in order to exactly form the desired configuration of the finished number roll that the semi-finished molded article 49, which is cylindrical, already is provided with the figures 49' on its outer surface in a three-dimensional fashion or in relief form and that this semi-finished molded article is subsequently supplemented to form the finished two-color molded article in a mold chamber 52. The diameter of chamber 52 corresponds to the maximum diameter b of FIGURE 7 of the semi-finished molding 49, this diameter being determined by the outer surface of the numbers or figures as shown as the diameter a in FIGURE 8. By this means a very smooth outer surface is provided to the finished number roll.

The casting mold of the present invention ensures the production of a radially symmetrical molded article having color and/or letter symbols appearing on the outer surface thereof with each injection cycle, that is, after each closing and opening stroke, respectively. This provides a substantial saving in time in comparison to the heretofore customary casting molds and modes of operation for producing two-color or two-material molded articles having radially symmetrical shape and symbols located on the outer surface thereof.

It will be understood that the above description of the present invention is susceptible to various modifications, changes, and adaptations, and the same are intended to be comprehended within the meaning and range of equivalents of the appended claims.

What is claimed is:

1. A casting mold, comprising, in combination:
   first and second mold halves movable relatively toward and away from each other for opening and closing the mold and having cooperating mold surfaces which together define two spaced mold chambers one for forming a semi-finished molded article and the other for forming a finished molded article, a portion of one of the mold halves having mold surfaces thereon being rotatable;
   one of said mold halves including first and second sections slightly displaceable with respect to each other in the opening and closing direction of the mold;
   said first section including a plurality of mold-surface defining elements movable at right angles to the opening and closing direction of the mold and arranged to define in part the mold chamber for forming a semi-finished molded article and having inner and outer abutment surfaces, said mold elements being arranged in the form of a closed geometric figure and defining mold surfaces which are concave and are provided with at least a portion of a symbol; and
   said second section including a plurality of elements having inner and outer abutment surfaces inclined toward the mold closing direction and engaging the abutment surfaces of said mold surface defining elements for moving the mold surface defining elements inwardly when said first and second sections move toward each other and outwardly when said first and second sections move away from each other.

2. A mold as defined in claim 1 comprising resilient spacer means between the mold sections for keeping the mold sections at a maximal distance from each other when the mold is opened.

3. A mold as defined in claim 1 comprising a plurality of support members for respectively engaging the rearward portion of a respective mold element when the mold is closed and mounted on said second section and extending into said first section.

4. A mold as defined in claim 1 wherein said mold surfaces are arranged to form a cylindrical article and the diameter of the mold chamber for the finished article is equal to the maximum diameter of the mold chamber for the semi-finished article.

5. A casting mold, comprising, in combination:
   first and second mold halves movable relatively toward and away from each other for opening and closing the mold and having cooperating mold surfaces which together define two spaced mold chambers one for forming a semi-finished molded article and the other for forming a finished molded article, a portion of one of the mold halves having mold surfaces thereon being rotatable;
   one of said mold halves including first and second sections slightly displaceable with respect to each other in the opening and closing direction of the mold;
   said first section including a plurality of mold-surface defining elements movable at right angles to the opening and closing direction of the mold and arranged to define in part the mold chamber for forming a semi-finished molded article;
   said second section including a plurality of pins inclined toward the mold closing direction and engaging said mold-surface defining elements; and
   rotary drive means including a hydraulic cylinder, said means being connected with the rotatable portion of one of said mold halves, and the axis of rotation extending parallel to the opening and closing direction of the mold.

6. A mold as defined in claim 6 wherein said hydraulic cylinder is a rotary cylinder whose piston rotates the rotatable mold portion by 180 degrees during its working stroke, and including a toothed piston rod and a one-way clutch to prevent the transmission of rotary movement during the piston stroke which is opposite to the working stroke.

7. In a casting mold for an injection molding machine for producing multi-color or multi-material molded articles wherein there are two mold halves and at least part of one of the mold halves is rotatably mounted and includes two mold profile surfaces spaced from each other and defining with the mold profile surfaces of the other mold half when the mold is closed, mold chambers one of which corresponds to the configuration of a semi-finished molded article and the other of which corresponds to the configuration of the finished molded article, the improvement wherein
   one of the mold halves includes first and second parts displaceable, within limits, with respect to each other in the closing direction of the mold,
   said first part including a plurality of mold elements and displaceable at right angles to the mold closing direction and arranged to aid in defining the mold profile surfaces for the semi-finished molded article, and
   said second part having a plurality of pin means inclined toward the mold closing direction and engaging the mold elements of said first part for moving the mold elements outwardly when said first and second parts move away from each other.

8. A casting mold, comprising, in combination:
   first and second mold halves movable relatively toward and away from each other for opening and closing the mold and having cooperating mold surfaces which together define two spaced mold chambers one for forming a semi-finished molded article and the other for forming a finished molded article, a portion of one of the mold halves having mold surfaces thereon being rotatable;
   one of said mold halves including first and second sections slightly displaceable with respect to each other in the opening and closing direction of the mold and biased toward a position slightly spaced from one another;
   said first section including a plurality of mold-surface defining elements movable radially at right angles to the opening and closing direction of the mold and arranged to define in part the mold chamber for forming a semi-finished molded article; and
   said second section including a plurality of pin means inclined toward the mold closing direction and engaging said mold-surface defining elements for moving said mold-surface defining elements outwardly when the mold halves are moved apart and thus when said sections move apart.

References Cited by the Examiner

UNITED STATES PATENTS

| | | |
|---|---|---|
| 2,226,408 | 12/1940 | Nast. |
| 2,298,365 | 10/1942 | Gits et al. |
| 2,327,665 | 8/1943 | Peat _____ 18—42 |
| 2,333,059 | 10/1943 | Tucker _____ 18—20 XR |
| 2,891,283 | 6/1959 | Cramer et al. |
| 2,994,921 | 8/1961 | Hultgren _____ 18—42 |
| 3,031,722 | 5/1962 | Gits _____ 18—42 XR |
| 3,145,423 | 8/1964 | Howereid _____ 18—42 |

J. SPENCER OVERHOLSER, *Primary Examiner.*

J. H. FLINT, *Assistant Examiner*